United States Patent [19]

Mihalich

[11] Patent Number: 4,861,630

[45] Date of Patent: Aug. 29, 1989

[54] MULTILAYERED ARTICLES FORMED BY COEXTRUSION OF POLYCARBONATE AND POLYESTER

[75] Inventor: James M. Mihalich, Rexford, N.Y.

[73] Assignee: General Electric Company, Pittsfield, Mass.

[21] Appl. No.: 139,721

[22] Filed: Dec. 30, 1987

[51] Int. Cl.⁴ .................. B65D 1/00; B32B 27/08; B32B 27/36

[52] U.S. Cl. .................. 428/34.1; 428/35.7; 428/412; 428/480

[58] Field of Search ............ 428/480, 412, 35, 34.1, 428/35.7; 525/422, 66; 528/126, 194; 229/2.5 R

[56] References Cited

U.S. PATENT DOCUMENTS

| | | | |
|---|---|---|---|
| 4,001,184 | 1/1977 | Scott | 528/126 X |
| 4,430,484 | 2/1984 | Quinn | 525/422 X |
| 4,465,820 | 8/1984 | Miller et al. | 528/194 |
| 4,469,270 | 9/1984 | Gartland | 229/25 R |
| 4,482,586 | 11/1984 | Smith et al. | 428/35 |
| 4,643,925 | 2/1987 | Smith et al. | 428/35 |
| 4,673,708 | 6/1987 | Rock et al. | 525/66 |
| 4,695,286 | 9/1987 | Vanier et al. | 428/480 |

*Primary Examiner*—Thomas J. Herbert
*Attorney, Agent, or Firm*—Spencer D. Conard

[57] ABSTRACT

The present invention relates to a multilayer article formed by the coextrusion of a polyester and polycarbonate. The polyester and polycarbonate are extruded into a film wherein the polyester forms the top and bottom layers of the film and the polycarbonate becomes the inner layer. The films may be thermoformed into articles which exhibit excellent strength and impact values.

18 Claims, No Drawings

MULTILAYERED ARTICLES FORMED BY COEXTRUSION OF POLYCARBONATE AND POLYESTER

BACKGROUND OF THE INVENTION

The present invention relates to a multilayer article comprising the coextrusion product of a polyester and polycarbonate.

Currently, there is a large commercial interest in the packaging industry for containers which are able to be heated in both conventional hot air ovens and microwave ovens. Polyesters and particularly polyethylene terephthalates are being employed in an increasing number of such applications. Unfortunately, to obtain the desired impact strengths, these containers have generally been constructed from relatively thick materials (e.g., 40 mils or more). The use of such thick materials adds substantially to the cost of the container. It therefore is desirable to provide articles for conventional and microwave use that provide improved strengths over the polyester articles which utilize less plastic.

SUMMARY OF THE INVENTION

The present invention relates to multilayer articles which are formed by the coextrusion of a polyester and polycarbonate. Advantageously, multilayer films of the present invention can be used in both cold and high temperature applications, are able to be mass produced with little waste, and have improved impact strengths over prior art polyester articles.

DETAILED DESCRIPTION OF THE PRESENT INVENTION

The present invention relates to multilayer articles that are formed by the coextrusion of a polyester and polycarbonate. The polyester and polycarbonate are first coextruded into a multilayer film which may be later used in packaging or thermoformed into containers such as trays. The multilayer articles have the advantage of ease of processing since the polycarbonate assumes its shape at a temperature above the crystallization temperatures of the polyester. This allows for crystallization of the article in a subsequent step to thermoforming which provides faster production rates.

The articles of the present invention have excellent low temperature impact strengths avoiding the typical brittleness of polyethylene terephthalate articles at freezing temperatures. Polycarbonate is not embrittled at these temperatures and imparts excellent impact properties to the articles.

The multilayer articles have improved high temperature dimensional stability by freeing the polyester from the low temperature impact requirements (i.e., thickness) and allows for higher crystallinity. The polycarbonate provides dimensional stability and offsets the brittleness commonly associated with crystalline polyesters.

The polyester that can be used in the present invention can be of the formula:

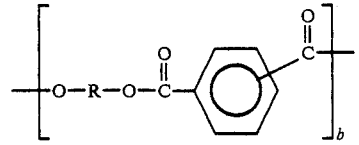

where b represents a whole number in excess of 1, e.g., 10 to 10,000 or more, R is a divalent alkylene radical containing from 1 to 10 or more carbon atoms, and the two carbonyl groups are located on the aromatic ring in a para- or meta- position relative to each other.

The polyesters can be obtained by any of the methods well-known to those skilled in the art including reaction of any aromatic dicarboxylic acid of the formula:

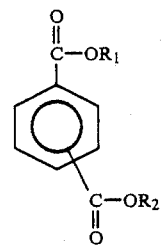

where independently $R_1$ and $R_2$ is an alkyl radical having from 1–10 or more carbon atoms with an aliphatic diol of the formula:

$$HO-R-OH$$

where R is as previously defined.

As used herein, and in the appended claims, the term polyesters include esters of the above formula prepared by esterifying or transesterifying terephthalic acid, isophthalic acid, or their low molecular weight esters of the above formula, or mixtures thereof, plus other polyesters derived from aromatic dicarboxylic acids on their alkyl esters and other aliphatic diols or polyols other than the above formulas, respectively.

Examples of polyesters that can be used in the invention include polyethylene terephthalate, polybutylene terephthalate resins and polycyclohexylene terephthalate, hereafter sometimes referred to as PET, PBT and PCT, respectively. PET is preferred for use in this invention. In general, the PET, PBT and PCT resins comprise high molecular weight poly(1,4-ethylene terephthalate) resins, poly(1,4-butylene terephthalate) resins and poly(1,4-cyclohexylene terephthalate) having repeating units of the general formulas, respectively:

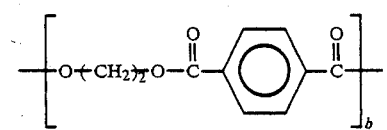

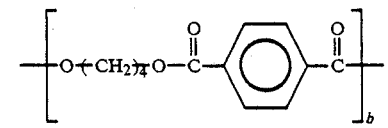

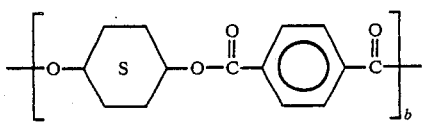

and mixtures thereof, b being as previously defined.

The polyesters which may be used in this invention also include PET copolyesters, PBT copolyesters and PCT copolyesters, i.e., esters that contain a minor amount, e.g., from about 0.5 to about 2% by weight, of repeating units derived from an aliphatic or another aromatic dicarboxylic acid and/or another aliphatic diol and polyol. Among the units which can be present in the copolyesters are those derived from aliphatic dicarboxylic acids, e.g., acids having up to about 50 carbon atoms, including cycloaliphatic, straight and branched chain acids, such as adipic acid, cyclohexanediacetic acid, dimerized $C_{16-18}$ unsaturated acids (which have 32 to 36 carbon atoms), trimerized such acids, and the like. Among the units in the copolyesters can also be minor amounts derived from aromatic dicarboxylic acids, e.g., acids having up to about 36 carbon atoms, such as isophthalic acid and the like. In addition to the PET and PBT units derived from ethylene glycol and 1,4-butylene glycol, respectively, there can also be minor amounts of units derived from other aliphatic glycols and polyols, e.g., di- and polyols having up to about 50 carbon atoms, including ethylene glycol, propylene glycol, butylene glycol, cyclohexanediol, and the like.

The polyesters useful in forming the multilayered articles are known as "high molecular weight." "High molecular weight" means a polyester having an intrinsic viscosity (I.V.) ranging from about 0.5 to about 1.10 and preferably from about 0.70 to about 1.0 as measured in a 60/40 by volume mixed solvent of phenol/tetrachloroethane at 30° C. The polyesters useful in the present invention will also be characterized by densities of about 1.361 grams per cubic centimeter or less.

Polycarbonates for use in the production of the multilayered articles of the invention are high molecular weight, thermoplastic, aromatic polymers and include homopolycarbonates, coopolycarbonates and copolyestercarbonates and mixtures thereof which have average molecular weights of about 8,000 to more than 200,000, preferably of about 20,000 to 80,000 and an I.V. of 0.40 to 1.0 dl/g as measured in methylene chloride at 25° C. In one embodiment, the polycarbonates are derived from dihydric phenols and carbonate precursors and generally contain recurring structural units of the formula:

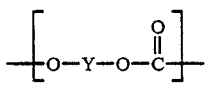

where Y is a divalent aromatic radical of the dihydric phenol employed in the polycarbonate producing reaction.

Suitable dihydric phenols for producing polycarbonates include the dihydric phenols such as, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxyphenyl)propane, and 3,3'-di-chloro-4,4'-dihydroxydiphenyl)methane. Other dihydric phenols which are also suitable for use in the preparation of the above polycarbonates are disclosed in U.S. Pat. Nos. 2,999,835, 3,038,365, 3,334,154, and 4,131,575, incorporated herein by reference.

It is of course possible to employ two or more different dihydric phenols or a copolymer of a dihydric phenol with a glycol or with a hydroxy- or acid-terminated polyester, or with a dibasic acid in the event a carbonate copolymer or interpolymer rather than a homopolymer is desired for use in the preparation of the articles of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and a branched polycarbonate.

The carbonate precursor employed can be either a carbonyl halide, a carbonate ester or a haloformate. The carbonyl halide which can be employed are carbonyl bromide, carbonyl chloride and mixtures thereof. Typical of the carbonate esters which can be employed are diphenyl carbonate, a di(halophenyl)carbonate such as di(chlorophenyl)carbonate, di(bromophenyl)carbonate, di(trichlorophenyl)carbonate, di(tribromophenyl)carbonate, etc., di(alkylphenyl)carbonate such as di(tolyl)carbonate, etc., di(napthyl)carbonate, di(chloronaphthyl)carbonate, etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate as described in Clayton B. Quinn in U.S. Pat. No. 4,430,484 and the references cited therein, incorporated herein by reference. Preferred polyestercarbonates are those derived from the dihydric phenols and carbonate precursors described above and aromatic dicarboxylic acids or their relative derivatives, such as the acid dihalides, e.g., dichlorides. A quite useful class of aromatic polyestercarbonates are those derived from bisphenol A; terephthalic acid, isophthalic acid or a mixture thereof or their respective acid chlorides; and phosgene. If a mixture of terephthalic acid and isophthalic acid is employed, the weight ratio of terephthalic acid to isophthalic acid may be from about 5:95 to about 95:5. Another polycarbonate which may be used has from about 70 to about 95 weight percent ester content and a range of terephthalate groups of from 2 to about 15 weight percent of the total ester content. The remaining ester units are isophthalate units. These polycarbonates are more commonly known as polyphthalate carbonates and are described, for example, by Miller et al., U.S. Pat. No. 4,465,820, herein incorporated by reference in its entirety.

The polycarbonates used to form the present invention can be manufactured by known processes) such as, for example, by reacting a dihydric phenol with a carbonate precursor such as diphenyl carbonate or phosgene in accordance with the methods set forth in the above-cited literature and U.S. Pat. Nos. 4,018,750 and 4,123,436, or by transesterification processes such as are disclosed in U.S. Pat. No. 3,153,008 as well as other processes known to those skilled in the art.

The aromatic polycarbonates are typically prepared by employing a molecular weight regulator, an acid acceptor and a catalyst. The molecular weight regulators which can be employed include phenol, cyclohexanol, methanol, alkylated phenols, such as octrylphenol, paratertiary-butyl-phenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate or an alkali or alkaline earth metal.

The catalyst which can be employed are those that typically aid the polymerization of the monomer with phosgene. Suitable catalysts include tertiary amines such as triethylamine, tripropylamine, N,N-dimethylaniline, quaternary ammonium bromide, cetyl triethyl ammonium bromide, tetra-n-heptyl ammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic, anhydride, pyromellitic acid, pyromellitic dianhydride, mellitic acid, mellitic anhydride, benzophenontetracarboxylic anhydride, and the like. The preferred polyfunctional aromatic compounds are trimellitic anhydride and trimellitic acid or their acid halide derivatives.

As used throughout this specification and the appended claims the term "crystallization temperature" means that temperature or temperature range in which a regularly repeating morphology, brought about by a combination of molecular mobility and secondary bonding forces, is induced in a polymer over a molecular distance of at least several hundred angstroms.

The multilayered film is formed by the coextrusion of the polyester and polycarbonate at a temperature at or above the melt temperature of the polycarbonate. The polyester is a relatively low viscosity material in the melt and has a tendency to flow to the outer surfaces of the film. The polycarbonate is a relatively high viscosity material in the melt and forms the middle layer of the multilayered film. The method of coextrusion is a method common to those skilled in the art.

After the polycarbonate and polyester have been coextruded to form a multilayered sheet, one can then process the film to form a number of packaging products. One may elect to utilize the film as is or thermoform the film to make trays, dishes, bowls, etc. If the film is thermoformed, the thermoformed article is heated to a sufficiently high temperature to crystallize the polyester. Upon crystallization, the article is die cut and is now suitable for use. Alternatively, the article can be die cut and then crystallized by heating. Surprisingly, the disadvantages of brittleness of crystallized polyester articles are avoided by the addition of amorphous polycarbonate which is particularly important in avoiding cracking during die cutting the crystallized articles.

The multilayered films can be extruded in a variety of thicknesses. Generally, such films range from a total thickness of about 1 to about 60 mils. Generally, the outer layer, i.e., top and bottom, of the film polyester having each layer having a thickness of from about 0.4 to about 30 mils. The middle layer is generally polycarbonate having a thickness of from about 0.1 to about 30 mils. Preferably, the outer layers of polyester each have a thickness of from 5 to 20 mils with the inner layer of polycarbonate ranging from about 3 to about 10 mils.

Various colorants may be used in the multilayer articles of the present invention. Preferably, the colorants are FDA-approved colorants since the articles may be used with foodstuffs. The colorants can be added at any stage during the preparation of the polyester material as during esterification or transesterification stage, the polycondensation stage, during resin drying, during extruding, and the like. Generally, any colorant, that is dyes which are soluble, or inorganic or organic pigments can be utilized. Examples of dyes include the various azo dyes, anthraquinone dyes, azine dyes, and the like. Examples of inorganic pigments which are added to the polyester to impart a color or hue thereto include titanium dioxide, carbon black, iron oxide, chromium oxide greens, iron blue, chrome green, violet pigments, ultramarine pigments, titanate pigments, pearlescent pigments, metallic pigments such as aluminum, browns, powders, etc., and the like. Organic pigments include monazo pigments, disazo pigments, and the like. Naturally, various amounts utilized to impart a desired color or hue and such amounts can change over a wide range.

The following example illustrates a specific multilayer article of the present invention. It should be understood that the example is given for the purpose of illustration and does not limit the invention.

EXAMPLE

A multilayer film of polycarbonate-polyester was formed by the coextrusion of the two polymers. The polycarbonate was known as Lexan®104 which is commercially available from the General Electric Company. The polyester was polyethylene terephthalate and is commercially available from the Goodyear Tire and Rubber Company of Akron, Ohio as Cleartuff®7207. The PET extruder had a heating profile of 540° F., 530° F., 520° F. and 520° F. The polycarbonate extruder had a heating profile of 535° F., 530° F., 530° F. and 520° F. The block was heated at 520° F. The temperature of the rolls was maintained at 205° F. (top), 155° F. (center) and 130° F. (bottom). The resulting multilayer film had a total thickness of 40 mils wherein the top layer of PET was 14 mil, the middle layer of polycarbonate was 8 mil and the bottom layer of PET was 18 mil.

While the present invention has been described with reference to particular embodiments thereof, it will be understood that numerous modifications may be made by those skilled in the art without actually departing from the spirit and scope of the invention as defined in the appended claims.

I claim:

1. A multilayer article comprising two outer layers and a middle layer, said outer layers comprising a polyester resin of the formula:

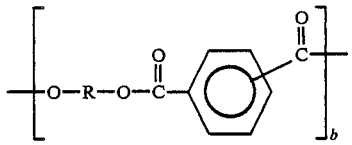

where b represents a whole number in excess of 1, R is a divalent alkylene radical containing from 1 to 10 or more carbon atoms, and the two carbonyl groups are located on the aromatic ring in a para- or meta- position relative to each other, said middle layer comprising a polycarbonate resin.

2. The multilayer article of claim 1, wherein said article is in the form of a film or container.

3. The multilayer article of claim 2, wherein said article is a film.

4. The multilayer article of claim 3, wherein said article consists essentially of three layers.

5. The multilayer article of claim 3, wherein the film is thermoformed.

6. The multilayer article of claim 5, wherein the polyester in the thermoformed film is crystallized by heating.

7. The multilayer article of claim 1 wherein the polycarbonate is derived from a dihydric phenol and a carbonate precursor.

8. The multilayer article of claim 7, wherein said dihydric phenol is 2,2-bis(4-hydroxyphenyl) propane and the carbonate precursor is carbonyl chloride.

9. The multilayer article of claim 7, wherein said dihydric phenol is 2,2-bis(4-hydroxyphenol)propane and the carbonate precursors is diphenyl carbonate.

10. The multilayer article of claim 2, wherein the polycarbonate contains recurring structural units of the formula:

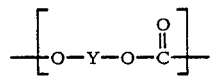

where Y is a divalent aromatic radical of the dihydric phenol employed in the polycarbonate procarbonate producing reaction.

11. The multilayer article of claim 1, wherein said polycarbonate is a polyphthalate carbonate prepared from a dihydric phenol, a carbonate precursor, a terephthalic acid or ester-forming derivative thereof, an isophthalic acid or ester-forming derivative thereof, said polyphthalate carbonate having from about 70 to 95 weight percent ester content and a range of terephthalate groups ranging from about 2 to about 15 percent of the ester content.

12. The multilayer article of claim 11, wherein the weight percent ester content is from 75 to 90.

13. The multilayer article of claim 12, wherein the range of terephthalate groups range about 5 to about 10 percent of the ester content.

14. The multilayer article of claim 1, wherein the polyester is polyethylene terephthalate.

15. The multilayer article of claim 1, wherein the polyester is polybutylene terephthalate.

16. The multilayer article of claim 1, wherein the polyester is polycyclohexylene terephthalate.

17. The multilayer article of claim 1, wherein the outer two layers are from about 0.4 to about 30 mils thick and the middle layer is from about 0.1 to about 30 mils thick.

18. The multilayer article of claim 1, wherein the outer two layers are from about 5 to about 20 mils thick and the middle layer is from about 3 to about 10 mils thick.

* * * * *